United States Patent [19]

Lyon et al.

[11] Patent Number: 5,100,269
[45] Date of Patent: Mar. 31, 1992

[54] CUTTING INSERT AND CLAMPING ARRANGEMENT THEREFOR

[75] Inventors: James R. Lyon, Ovid, Mich.; Gary L. Morsch, Dayton, Minn.; Gerald D. Murray, Raleigh, N.C.; James B. Robinson, Speedway, Ind.

[73] Assignee: Kennametal Inc., Latrobe, Pa.

[21] Appl. No.: 655,225

[22] Filed: Feb. 12, 1991

Related U.S. Application Data

[60] Continuation of Ser. No. 413,419, Sep. 27, 1989, abandoned, which is a division of Ser. No. 231,792, Aug. 12, 1988, Pat. No. 4,946,319.

[51] Int. Cl.⁵ .............................................. B23B 29/04
[52] U.S. Cl. ...................................... 407/107; 407/117
[58] Field of Search ............... 407/107, 108, 109, 110, 407/111, 112, 114, 115, 116, 117, 118, 119

[56] References Cited

U.S. PATENT DOCUMENTS

| | | | |
|---|---|---|---|
| 3,688,366 | 9/1972 | Jones | 407/86 |
| 3,754,309 | 8/1973 | Jones et al. | 407/107 |
| 3,911,543 | 10/1975 | Sorice | 407/77 |
| 3,934,320 | 1/1976 | McCreery | 407/107 |
| 4,195,956 | 4/1980 | Mihic | 407/108 |

Primary Examiner—William E. Terrell
Attorney, Agent, or Firm—Thomas R. Trempus

[57] ABSTRACT

A cutting insert with improved chip control and metal cutting capabilities and a toolholder with an improved clamping arrangement for use in combination therewith. The insert includes a first notch disposed in the insert body extending from the cutting end to the mounting end thereof. A top wall of the insert body has a forward section with a cutting edge, a middle section with a second notch extending across substantially the entire insert body and a rearward section. In one embodiment, the forward section of the insert body includes a chipbreaker. In another embodiment, the forward portion includes an advanced cutting material which defines a cutting edge. In yet another embodiment of the insert, the insert body top wall forward section defines the cutting edge and the insert body does not include a chipbreaker.

10 Claims, 4 Drawing Sheets

CUTTING INSERT AND CLAMPING ARRANGEMENT THEREFOR

This is a continuation of copending application Ser. No. 07/413,419 filed on Sept. 27, 1989, abandoned which was a division of Ser. No. 07/231,792, filed on Aug. 12, 1988, and issued as U.S. Pat. No. 4,946,319, on Aug. 7, 1990.

FIELD OF THE INVENTION

The invention is directed to cutting inserts, especially metal cutting inserts with chip control and to a holder and clamp arrangement therefor.

BACKGROUND OF THE INVENTION

Cutting inserts are well known and a large percentage of them are of the throw away design. Such inserts are detachably clamped on a holder and then are discarded when they become dull or chipped.

The inserts must be securely and accurately held in place within an insert holder during the cutting operation. This is especially true when the inserts are employed with numerically controlled machines which depend for accuracy upon an accurately located and firmly supported insert. When the inserts are of a substantial area, it is possible to fix the insert both accurately and firmly within the pocket of a toolholder by providing the insert with a central hole and the toolholder with a pin-type clamping device. In other cases, such inserts may be held in place by a top clamp. Examples of such holders are found in U.S. Pat. Nos. 3,754,309; 3,399,442 and 3,762,005 and British Patent Specification 1,363,542.

Several toolholding systems designed to work in cooperation with specific insert configurations are available in the metal cutting industry. One example of such a system is the TOP NOTCH brand toolholder and insert combination which is taught in U.S. Pat. No. 3,754,309 and which is manufactured and sold by Kennametal Inc., the assignee of the subject invention. This style of insert which is characterized by a diagonal notch is retained in a three-sided toolholder pocket by means of a clamp arrangement which engages both the notch in the insert and a diagonal recess in the toolholder body.

Another example of a dedicated toolholder-insert system is marketed by the Greenleaf Corporation of Saegertown, Pa. This system employs a toolholder with a female "V" shaped seat in which an insert with a corresponding male "V" bottom is retained by a clamp adjustably held in the toolholder. Iscar Tools LTD., markets a similar toolholder with a female "V" shaped seat in which an insert with a corresponding male "V" bottom is retained. Iscar also a markets a toolholder with an insert-pocket wedge geometry having a female "V" shaped seat on the bottom and a male "V" shaped seat on the top. An insert with corresponding male and female "V" shaped bottom and top portions is passively retained in the pocket. No adjustable clamping arrangement is provided in the Iscar toolholder.

Such a basic toolholder and insert configuration in which a female "V" shaped seat supports a corresponding male "V" bottom shaped insert as described in the aforesaid several examples has achieved a demonstrated level of acceptance and popularity within the metalworking industry. However, it has been discovered that this configuration results in the generation of significant tensive stresses on the toolholder female "V" shaped seat. The stress in made manifest in the spreading which can occur in the female "V" shaped seat over the life of the toolholder. As the seat spreads, the cooperative seating arrangement of the insert in the toolholder diminishes in quality, resulting in a rocking motion of the insert within the female "V" shaped seat of the toolholder. Because of the high degree of accuracy required in metalworking operations, any discrepancy in the actual position of the insert during metalworking operations from its planned and anticipated position can result in irreparable damage to the workpiece. More particularly, the tensive stresses typically exerted upon the prior art toolholders' insert seats by their inserts are significant and these forces ultimately resulted in a reduced accuracy in insert location and positioning during metalworking operations.

The main object of metal machining is the shaping of the new work surface. Much attention is paid to the formation of the chip during the machining process, even through the chip is a waste product. This is because the consumption of energy occurs mainly in the formation and movement of the chip. Also, a chip can turn back into the workpiece and damage the machined finish thereof. This represents significant problem, for example, in machining aluminum wheels in the automotive industry or when deep grooving, profiling or cutting off any material, including synthetics, that produce a continuous chip. Moreover, in certain metal cutting operations it has been found that the chips can cause excessive wear and/or damage to the clamping arrangement and/or toolholder. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the metal or alloy of the workpiece.

It has been a common practice to place a mechanical chip breaking member between the insert and the clamp securing the insert to the tool in order to provide at least a degree of chip control during the cutting operation. This arrangement presents the obvious drawback of increasing the effective area necessary for metal cutting operations with a given tool.

Because chip control is an important consideration in metal cutting operations, it has been a long standing objective in the art of metal cutting to develop improved chip control techniques for use with tools as well as improved designs for the cutting inserts. Among the improvements to the cutting insert are various chip control geometries which can be molded into the insert during manufacture. These geometries include various depressions and elevations on the surface of the insert.

It is an object of the invention to provide an insert with improved chip control characteristics.

It is another object of this invention to provide a method of manufacturing an insert incorporating advanced cutting tool materials and having improved chip control.

It is an object of this invention to provide an improved seating arrangement for an insert and toolholder which results in the controllable and consistent placement of the insert with respect to the toolholder and extends the useful life of the toolholder.

It is still another object of this invention to provide an insert with improved metal cutting capabilities when machining, for example, nonferrous and abrasive materials or other materials, including synthetics that produce a continuous chip.

It is yet another object of this invention to provide an improved chip control insert configured to cooperate with a clamping element of an insert toolholder.

It is still another object of this invention to provide a toolholder with an improved clamping arrangement for use in combination with cutting inserts, chip control features and advanced cutting tool materials.

SUMMARY OF THE INVENTION

The invention provides both a cutting insert with a unique configuration that results in improved chip control and a metal cutting capabilities and a toolholder with an improved clamping arrangement for use in combination therewith. A high degree of repeatability and accuracy during metalworking operations is now possible through the controllable and consistent placement of the insert with respect to the toolholder. The improved clamping arrangement substantially eliminates chip erosion of the clamp elements and chip congestion about the clamping elements. The clamping arrangement also extends toolholder life by reducing the tensive stresses exerted upon the insert seating configuration by the insert during metalworking operations.

The improved cutting insert comprises an insert body with a first and second mounting end. A pair of substantially parallel side walls extend between the first and second ends. A bottom wall is generally perpendicular to the side walls and includes means therein defining a first notch. The first notch is disposed in the insert body and substantially extends from the first end or cutting end to the second end or mounting end of the insert. A top wall of the insert body has a forward section, a middle section and a rearward section. The forward section in combination with the first or cutting end includes means defining a cutting edge disposed at a first elevation relative to the bottom wall of the insert body. The middle section includes means defining at least in part a second notch extending across substantially the entire insert body between the side walls. The bottom or trough of the second notch portion is disposed at a second elevation relative to the bottom wall. The rearward section is disposed at a third elevation relative to the bottom wall. The third elevation is less than the first elevation and greater than the second elevation.

In one embodiment, the top wall forward section of the insert body can also include means defining a chipbreaker. The means defining the chipbreaker is formed during the manufacture of the insert as an integral portion of the insert body and is disposed at a fourth elevation relative to the bottom wall. This fourth elevation is greater than the first elevation. In another embodiment, the top wall forward portion means which defines the chipbreaker can further include means defining a slot adapted to receive partially therein an advanced metal cutting material such as, for example, a polycrystalline diamond material or a polycrystalline cubic boron nitride (CBN) material or a material of similar quality. The polycrystalline material is bonded to the top wall forward section of the insert body and the means defining the chipbreaker extends at least partially over the polycrystalline material. The polycrystalline material defines a cutting edge and the means defining the chipbreaker may define in part a curvilinear surface. In yet another embodiment of the insert, the insert body top wall forward section defines the cutting edge and the insert body does not include a chipbreaker.

A cutting insert toolholder for use with the aforedescribed insert comprises a holder means having a first end, a second end, a top surface and a longitudinal mounting axis. The first end has a cutting insert receiving pocket formed therein. The pocket has one end wall means and a bottom wall means and is open on the other four sides. The bottom wall means includes means defining a first engaging means for the cutting insert. This engaging means extends parallel to the longitudinal mounting axis of the holder means. The top surface has a recess therein adjacent the insert receiving pocket. The recess is substantially perpendicular to the longitudinal mounting axis. A clamp element includes a pair of dependent legs. One of the legs defines a second engaging means for engaging the cutting insert. The other of the legs of the clamping element is adapted to cooperate with the recess in the holder means top surface. Means on the holder means engage the clamp element and are adjustable relative thereto for urging the clamp element toward the holder means. When so urged, the clamp element presses one of the legs into the recess and the other of the legs into engagement with the cutting insert for fixedly clamping the cutting insert in the pocket. The first engaging means in the bottom wall of the insert pocket inhibits lateral movement of the cutting insert relative to the longitudinal mounting axis. The second engaging means inhibits axial movement of the cutting insert relative to the longitudinal mounting axis.

Preferably, the means defining the first engaging means for the cutting insert which extend parallel to the longitudinal mounting axis comprises a seat having an inverted V-shaped portion on which the cutting insert is mounted. When the insert is mounted in the toolholder pocket, the insert toolholder is dimensioned so that the first end thereof is of a predetermined width which is less than the remaining portion of the toolholder. Preferably, this predetermined width of the first end of the toolholder is less than the width of the cutting insert cutting edge in order to facilitate presentation of the insert cutting edge to a workpiece. The clamp element and its pair of dependent legs is preferably dimensioned so as to have a limited elevational profile. This limited profile minimizes the possibility of damage being inflicted on the clamp element by the chips coming from the workpiece. Additionally, this limited profile minimizes the damage which can be inflicted on the workpiece finish by chips curling back against it by permitting the unobstructed flow of chips away from the workpiece and across the top of the insert and clamp combination of this invention. Moreover, the limited profile of the clamp element substantially eliminates chip congestion at and about the clamp element.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
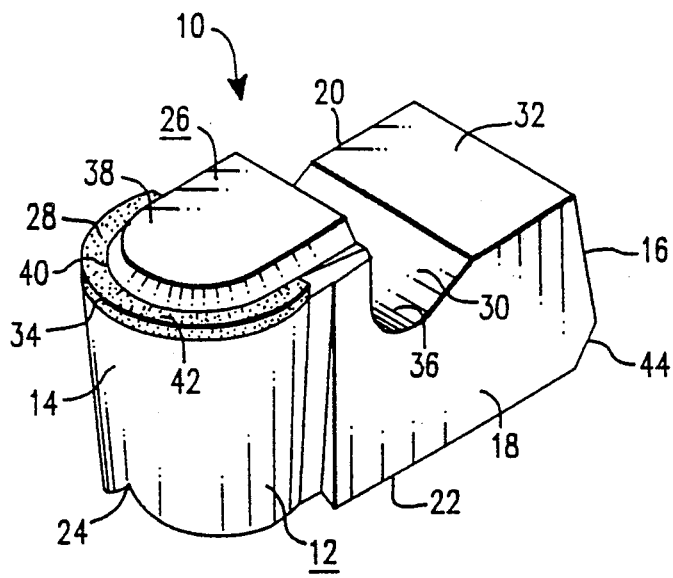
FIG. 1 is an isometric view of a cutting insert with chip control features and polycrystalline cutting edge, all according to the present invention.
Figure 3:
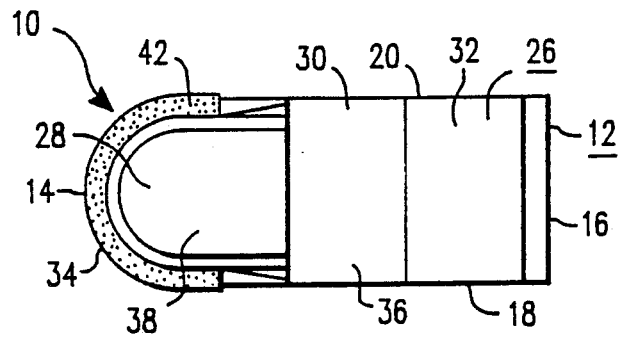
FIG. 3 is a plan view of the cutting insert with chip control features and polycrystalline cutting edge of this invention.
Figures 4, 5:
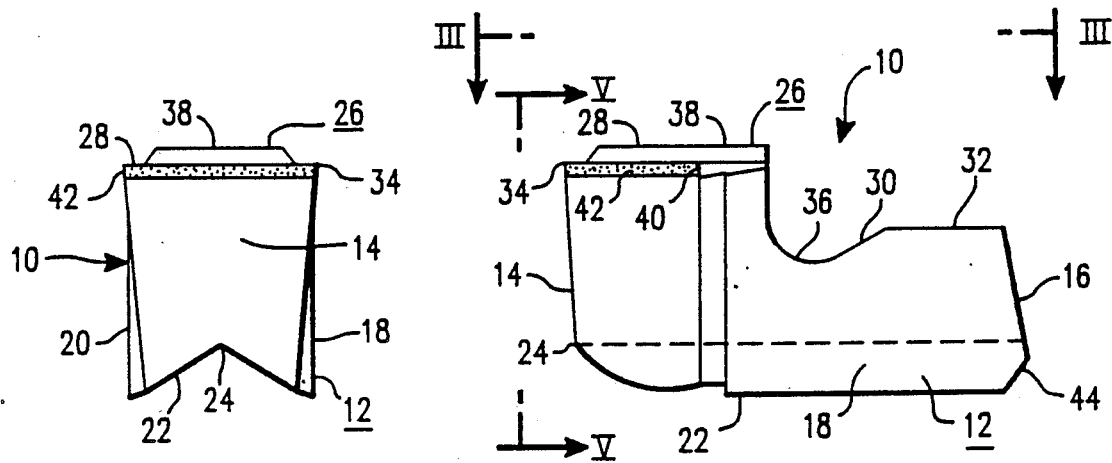
FIG. 4 is a side view of the insert with chip control features and polycrystalline cutting edge of this invention.
FIG. 5 is a front elevational view of the insert with chip control features and polycrystalline cutting edge of this invention.
Figure 2:
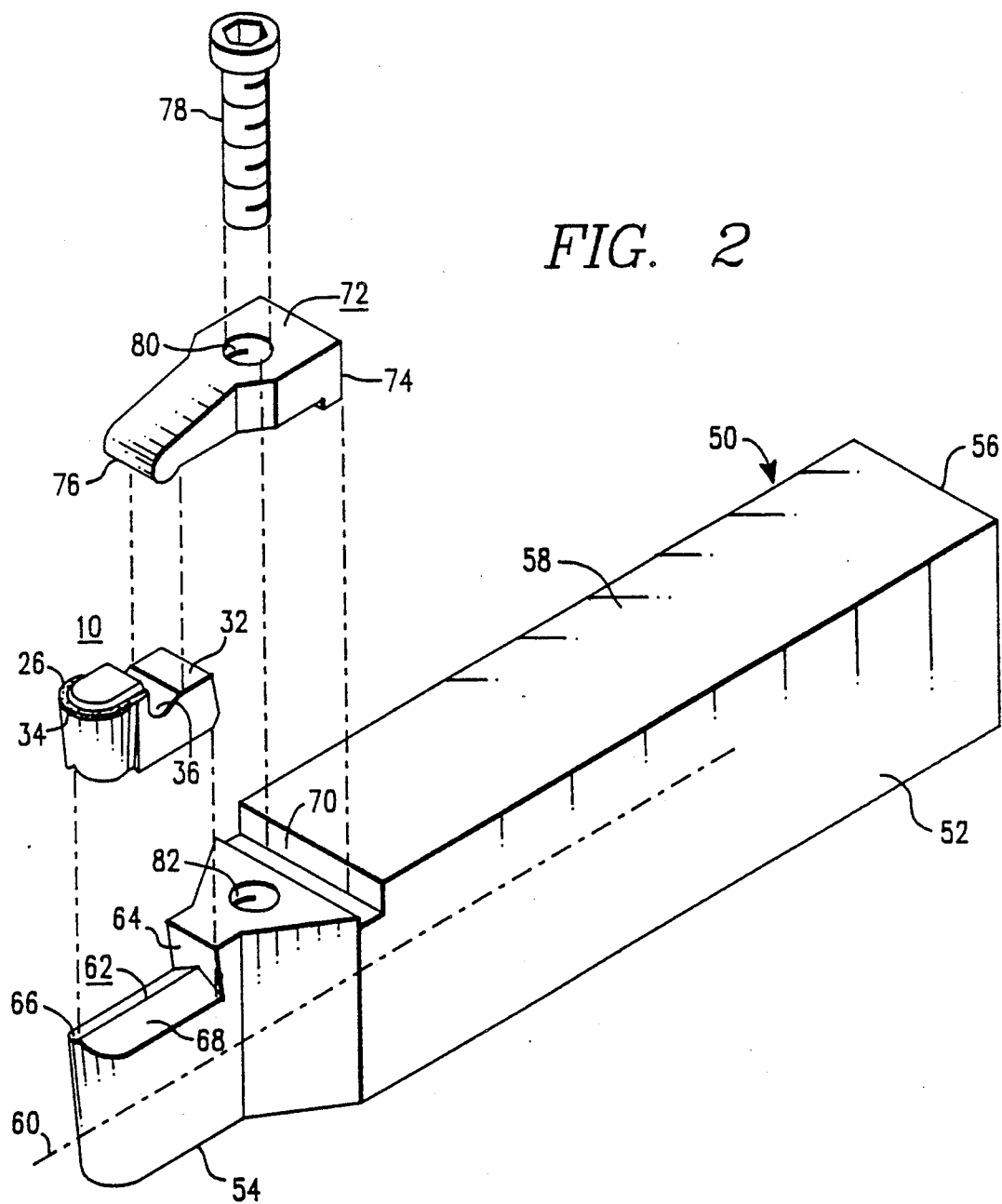
FIG. 2 is an exploded perspective view illustrating a holder and clamping arrangement for use in combination with a cutting insert all according to this invention.

A cutting insert with improved chip control features and metal cutting capabilities is isometrically shown in FIG. 1 and generally indicated by the reference character 10. The insert incorporates a hard cemented carbide substrate and a cutting edge formed from an advanced cutting tool material. The insert 10 comprises an insert body 12 having a first end 14 and a second end 16. The first end 14 is generally referred to as the cutting end and the second end 16 as the mounting end. A pair of substantially parallel walls 18 and 20 extend between the first and second ends. It will be noted, however, that the cutting end 14 has a slightly cylindrical shape on whole. However, while the cutting edge can be a curvilinear edge which is presented to a workpiece, the cutting edge can be of a geometry appropriate for deep grooving, profiling, parting or cutting operations. It should be appreciated that the specific cutting application for which the insert is to be used dictates the geometry of the cutting edge and the cutting end 14 of the insert body. A bottom wall 22 is generally perpendicular to the side walls 18 and 20. The bottom wall 22 includes therein means 24 defining a first notch disposed in the insert body 12. The notch means 24 extends from the first end 14 to the second end 16 of the insert body. The notch 24 defines an inverted V-shaped trough along the bottom wall 22 of the insert body. The insert body 12 includes a top wall portion 26 having a forward section 28, a central or middle section 30 and a rearward section 32. The forward section 28, in combination with the first end 14 of the insert body, define a cutting edge 34. The cutting edge 34 is disposed at a first elevation with respect to the bottom 22 of the insert body. The middle section 30 includes means 36 defining at least in part a second notch extending substantially across the insert body from first side 18 to the second side 20. The bottom or trough portion of the notch 36 is at a second elevation relative to the bottom wall 22 of the insert body. The rearward section 32 of the top wall 26 of the insert body is disposed at a third elevation relative to the bottom wall 22. The rearward section 32 is generally planar and perpendicular to the sides 18 and 20 of the insert body. The rearward section 32 of the top wall 26 is at a third elevation which is less than the first elevation and greater than the second elevation.

The insert body itself is manufactured according to techniques well known in the art of metalcutting insert manufacture. The insert body is preferably a hard cemented carbide such as tungsten or titanium carbide or tungsten titanium carbide, or a cermet or a sialon material, for example.

In the embodiment of FIGS. 1 through 5, the top wall 26 forward section 28 of the insert body 12 includes means 38 defining a chipbreaker. The chipbreaker means is disposed at a fourth elevation relative to the bottom 22 of the insert body, which elevation is greater than the first elevation defined between the cutting edge 34 and the bottom 22 of the insert body. The chipbreaker means 38 further includes means 40 defining a slot therein. In this embodiment of the insert of this invention, a polycrystalline diamond material or a polycrystalline cubic boron nitride (CBN) material or a material of similar quality (hereinafter referred to as polycrystalline material) is bonded to the top wall forward section 28 of the insert body. When used in combination with the chipbreaker as shown, the slot 40 of the chipbreaker 38 is dimensioned so as to receive therein the rearward portion of the polycrystalline material which is bonded to the top surface 28 of the insert body. This polycrystalline material 42 is manufactured separately from the insert body and later bonded thereto by, for example a brazing technique. In FIG. 1, both the cutting edge 34, defined by the polycrystalline material 42, as well as the chipbreaker means 38, are shown to have curvilinear edges or faces which are presented to a workpiece. It should be appreciated that the specific cutting application for which the insert is to be used dictates the geometry of both the cutting edge 34 and the chipbreaker means 38.

The rear wall 16 of the insert body 12 can be made so as to have a clearance angle which facilitates mounting of the insert and retention thereof in the toolholder. Additionally, the intersecting edge of the insert body bottom portion 22 side walls 18 and 20 and rear end 16 can be beveled as at 44. This bevel 44 also enhances the ease of mounting and securing the insert within the toolholder.

A toolholder for use with the insert described above is generally indicated by the reference character 50. The toolholder 50 is in the form of a bar-like steel member 52 adapted for being clamped in a tool support of any suitable type. The holder means 50 has a first end 54, a second end 56, a top surface 58 and a longitudinal mounting axis shown at 60. The first end 54 has a cutting insert receiving pocket 62. The receiving pocket has one end wall means 64 and a bottom wall means 66. The receiving pocket 62 is open on the other four sides. The bottom wall means 66 includes means 68 defining a first engaging means. The engaging means 68 extends parallel to the longitudinal mounting axis along substantially the entire bottom wall 66 of the insert pocket 62. The engaging means 68 on which the cutting insert 10 is mounted is preferably an inverted V-shaped portion. The inverted V-shaped portion, or male V, 68 mates with the female V-shaped portion 24 on the bottom wall 22 of the insert body 12. The combined mating means 68 and 24 cooperate to insure axial alignment along the longitudinal mounting axis 60 of the toolholder 50. The end wall 64 of the pocket 62 is dimensioned so as to cooperate with the clearance angle of the end wall 16 of the insert body 12.

The top surface 58 of the holder 50 includes a recess 70 therein. The recess 70 is adjacent the insert receiving pocket 62 and is substantially perpendicular to the longitudinal mounting axis 60.

A clamp element 72 has a pair of dependent legs 74 and 76, with a lower surface extending therebetween. One of the legs 76 defines a second engaging means which cooperates with the notch 36 in the top wall 26 of the insert body 12. The other of the legs 74 is adapted to cooperate with the recess 70 in the top surface 58 of the holder 50.

Means are provided on the holder 50 to engage the clamp element and urge the clamp element toward the holder means. This holding and engaging means comprise a clamp screw 78 which extends through a hole 80 in the clamping element 72 which is between the legs thereof and into a threaded hole 82 in the top surface 58 of the toolholder 50. When the insert is placed in the pocket, the clamp member is put in position, and screw 78 is tightened up, and the insert is pressed firmly against the bottom wall 66 of the insert pocket 62 while simultaneously being drawn toward end wall 64. The insert is thus fixedly clamped in the pocket in the holder and is accurately located therein by being urged against the walls of the pocket. As indicated above, alignment of the insert relative to the toolholder is effected by a combination of the engaging means 68 on the bottom wall of the pocket 62 and the means 24 defining the notch in the bottom wall of the insert body. The configuration of the toolholder's insert receiving pocket in combination with the configuration of the insert body results in a stable and repeatable insert location for presentation of the insert's cutting edge to the workpiece. Further, the infinitely variable changes in the resultant forces acting on the cutting insert do not adversely effect the location of the insert's cutting edge during metal cutting operations.

The unique configuration of the cutting insert receiving pocket 62 eliminates one cause of reduced tool life experienced with prior art toolholder and insert designs. In prior art designs, as previously discussed herein, the toolholder is provided with a female "V" shaped seat into which an insert is inserted and mounted with a clamping arrangement. The corresponding male "V" shaped insert bottom or seat would act as a wedge in the toolholder's female "V" shaped seat. The mounted insert provides surface loading on the "extending arms" of the female "V" shaped seat. The resultant forces on the extended arms leads to a bending component and tensive stresses in the toolholder seat.

As a result of the unique configuration of the cutting insert receiving pocket 62 and its use with the insert according to the present invention, the male "V" shaped seat experiences compressive forces as a result of the surface loading from the mounted female "V" shaped insert. The compressive stress carrying capability of the design of the instant toolholder insert mounting seat, the receiving seat 62, is approximately two to three times greater than the tensive stress carrying capability of the prior art female "V" shaped seat. Because the toolholder insert receiving pocket 62 maintains its original configuration and is not distorted by the surface loading of the insert, potential rocking of the insert relative to the toolholder as it is seated within the toolholder is substantially eliminated.

Figure 6:
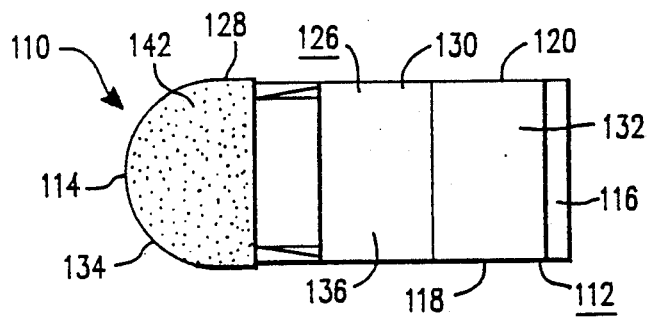
FIG. 6 is a plan view of an alternative embodiment of the cutting insert of this invention.
Figure 7:
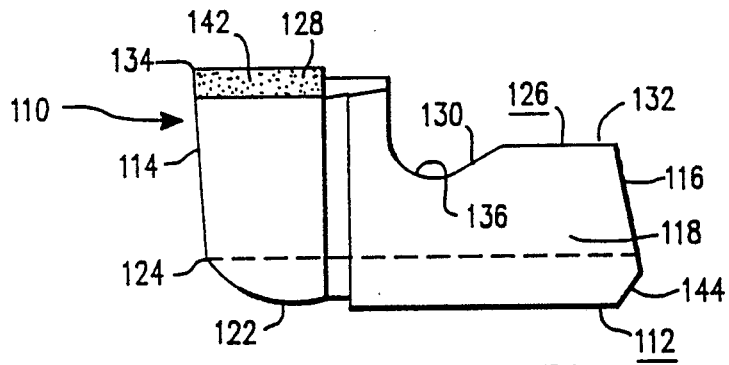
FIG. 7 is a side view of an alternative embodiment of the cutting insert of this invention.

Turning now to FIGS. 6 and 7, there is shown a plan view and a side view respectively of a first alternative embodiment of the cutting insert of this invention. Basically, the alternative embodiment does not incorporate the chipbreaker 38 shown in the embodiment of FIGS. 1 through 5. The insert 110 comprises an insert body 112 having a first end 114 and a second end 116. The first end 114 is generally referred to as the cutting end and the second end 116 as the mounting end. A pair of substantially parallel walls 118 and 120 extend between the first and second ends. It will be noted, however, that the cutting end 114 has a slightly cylindrical shape on whole. However, while the cutting edge can be a curvilinear edge which is presented to a workpiece, the cutting edge can be of a geometry appropriate for deep grooving, profiling, parting or cutting operations. It should be appreciated that the specific cutting application for which the insert is to be used dictates the geometry of the cutting edge and the cutting end 114 of the insert body. A bottom wall 122 is generally perpendicular to the side walls 118 and 120. The bottom wall 122 includes therein means 124 defining a first notch disposed in the insert body 112. The notch means 124 extends from the first end 114 to the second end 116 of the insert body. The notch 124 defines an inverted V-shaped trough along the bottom wall 122 of the insert body. The insert body 112 includes a top wall portion 126 having a forward section 128, a central or middle section 130 and a rearward section 132. The forward section 128, in combination with the first end 114 of the insert body, define a cutting edge 134. The cutting edge 134 is disposed at a first elevation with respect to the bottom 122 of the insert body. The middle section 130 includes means 136 defining at least in part a second notch extending substantially across the insert body from first side 118 to the second side 120. The bottom or trough portion of the notch 136 is at a second elevation relative to the bottom wall 122 of the insert body. The rearward section 132 of the top wall 126 of the insert body is disposed at a third elevation relative to the bottom wall 122. The rearward section 132 is generally planar and perpendicular to the sides 118 and 120 of the insert body. The rearward section 132 of the top wall 126 is at a third elevation which is less than the first elevation and greater than the second elevation.

In this embodiment of the insert of this invention, a polycrystalline diamond material is bonded to the top wall forward section 128 of the insert body. This polycrystalline material 142 is manufactured separately from the insert body and later bonded thereto by, for example a brazing technique. The cutting edge 134, defined by the polycrystalline material 142 has a curvilinear edge which is presented to a workpiece. It should be appreciated that the specific cutting application for which the insert is to be used dictates the geometry of the cutting edge 134.

The rear wall 116 of the insert body 112 can be made so as to have a clearance angle which facilitates mounting of the insert and retention thereof in the toolholder. Additionally, the intersecting edge of the insert body bottom portion 122 side walls 118 and 120 and rear end 116 can be beveled as at 144. This bevel 144 also enhances the ease of mounting and securing the insert within the toolholder.

Figure 10:
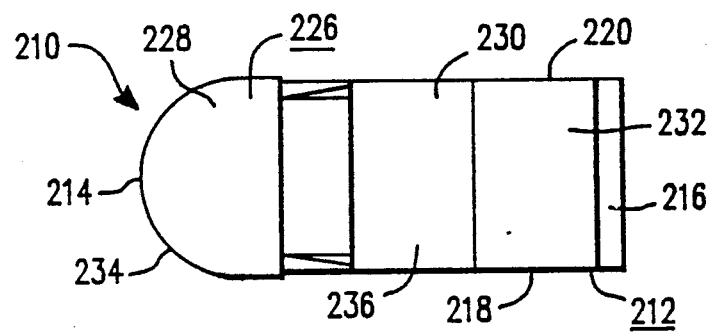
FIG. 10 is a plan view of an alternative embodiment of the cutting insert of this invention.
Figure 11:
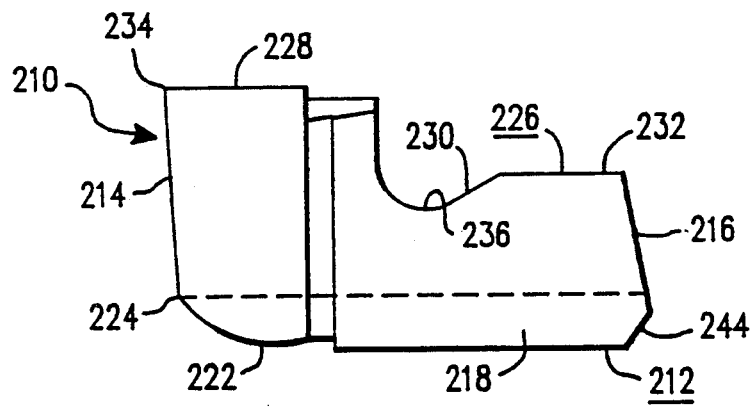
FIG. 11 is a side view of a second alternative embodiment of the cutting insert of this invention.

A second alternative embodiment of the invention is shown in FIGS. 10 and 11. Basically, the alternative embodiment does not incorporate the chipbreaker or the polycrystalline material shown in the embodiments of FIGS. 1 through 7. The insert 210 comprises an insert body 212 having a first end 214 and a second end 216. A pair of substantially parallel walls 218 and 220 extend between the first and second ends. It will be noted, however, that the cutting end 214 has a slightly cylindrical shape on whole. A bottom wall 222 is generally perpendicular to the side walls 218 and 220. The bottom wall 222 includes therein means 224 defining a first notch disposed in the insert body 212. The notch means 224 extends from the first end 214 to the second end 216 of the insert body. The notch 224 defines an inverted V-shaped trough along the bottom wall 222 of the insert body. The insert body 212 includes a top wall portion 226 having a forward section 228, a central or middle section 230 and a rearward section 232. The forward section 228, in combination with the first end 214 of the insert body, define a cutting edge 234. The cutting edge 234 is disposed at a first elevation with respect to the bottom 222 of the insert body. The middle section 230 includes means 236 defining at least in part a second notch extending substantially across the insert body from first side 218 to the second side 220. The bottom or trough portion of the notch 236 is at a second elevation relative to the bottom wall 222 of the insert body. The rearward section 232 of the top wall 226 of the insert body is disposed at a third elevation relative to the bottom wall 222. The rearward section 232 is generally planar and perpendicular to the sides 218 and 220 of the insert body. The rearward section 232 of the top wall 226 is at a third elevation which is less than the first elevation and greater than the second elevation.

As indicated above, in this embodiment of the insert, a polycrystalline material is not bonded to the top wall forward section 228 of the insert body. Rather, in this embodiment, the cutting edge 234 is defined by the forward section 228 of the insert body. The cutting edge can be a curvilinear edge which is presented to a workpiece or the cutting edge can be of a geometry appropriate for deep grooving, profiling or cutting operations. It should be appreciated that the specific cutting application for which the insert is to be used dictates the geometry of the cutting edge 234.

The rear wall 216 of the insert body 212 can be made so as to have a clearance angle which facilitates mounting of the insert and retention thereof in the toolholder. Additionally, the intersecting edge of the insert body bottom portion 222 side walls 218 and 220 and rear end 216 can be beveled as at 244.

A third alternative embodiment of the invention provides a modification of the cutting insert shown in FIGS. 1 through 4 wherein the insert does not include the polycrystalline material. In this embodiment which is not illustrated herein, but which can be readily appreciated in view of the second alternative embodiment as shown in FIGS. 10 and 11, the insert body is of the configuration described in association with FIGS. 1 through 5 with the exception that the means 40 defining the slot in which the polycrystalline material is mounted as well as the polycrystalline material are not present. In this embodiment, the cutting edge is defined by the forward section 28 of the insert body. The cutting edge can be a curvilinear edge which is presented to a workpiece as shown in the Figures or, for example, the cutting edge can be of a geometry appropriate for deep grooving, profiling or cutting operations. It should be appreciated that the specific cutting application for which the insert is to be used dictates the geometry of the cutting edge.

Figure 8:
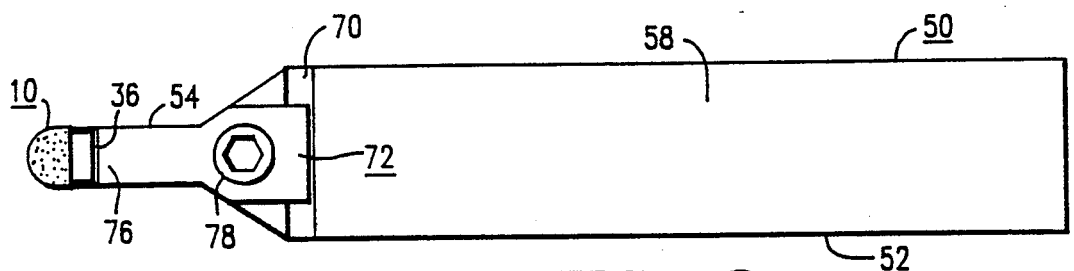
FIG. 8 is a plan view of the holder of this invention with cutting insert retained therein.
Figure 9:
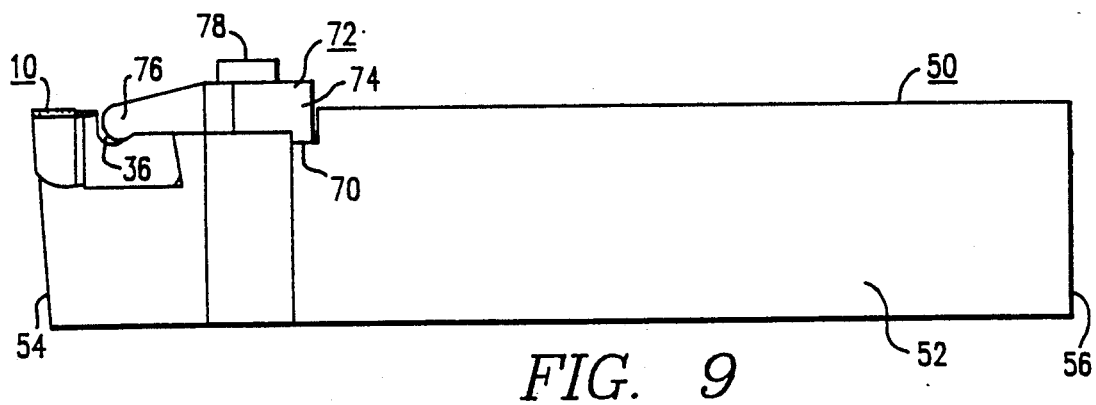
FIG. 9 is a side view of the holder of this invention with cutting insert retained therein.

Turning now to FIGS. 8 and 9, a plan view of the toolholder of this invention with the alternative embodiment of the cutting insert as shown in FIGS. 6 and 7 retained therein is shown in a plan and side view respectively. As can be clearly seen in FIGS. 8 and 9, the first end 54 of the toolholder 50 is of a dimension which is significantly less in width than the remainder of the toolholder body. As can clearly be seen in the plan view, the cutting edge of the insert is of a greater width than the width of the insert body and the toolholder pocket 62. This configuration provides clearance between the toolholder and the workpiece when engaged in cutting operations. A particularly unique feature of the combined cutting insert and toolholder is the low profile of the clamping element with respect to the cutting edge of the insert. When used in combination with the chipbreaker design shown in FIGS. 1 through 4, the clamp element is substantially protected from chips coming from the workpiece. Additionally, the extremely low profile of the clamping element relative to the cutting edge of the insert minimizes, if no substantially eliminating, the adverse consequence of a chip being forced back onto the workpiece by contact with a clamping element. It can be seen that a chip is unhampered as it is removed from the workpiece and can travel rearwardly away from the cutting edge of the insert. Thus chip congestion and chip build up in the clamping area is substantially eliminated.

It has been found that a metal cutting insert incorporating the features described herein when used in combination with the toolholder provided therefor renders significantly improved chip control over a wide variety of metalcutting conditions. What has been described is an improved cutting insert and toolholder clamping arrangement for use therewith.

What is claimed is:

1. In combination with a cutting insert, a cutting insert tool holder comprising:

holder means having a first end, a second end, a top surface and a longitudinal mounting axis;

said first end having a cutting insert receiving pocket formed therein which pocket has one end wall means and a bottom wall means and being open on the other four sides, said bottom wall means defining a first engaging means for engaging a bottom of said insert; comprising a seat having an inverted "V" shaped portion on which said cutting insert is mounted and extending parallel to said longitudinal mounting axis, said end wall means comprising means for engaging a rear wall of said insert;

said top surface having a recess therein near said insert receiving pocket, said recess being substantially perpendicular to said longitudinal mounting axis;

a clamp element having a lower surface pair of dependent legs depending below said lower surface, one of said legs defining a second engaging means for engaging a top of said cutting insert, and the other of said legs adapted to cooperate with said recess in said holder means top surface;

and means on said holder means engaging said clamp element and adjustable for urging said clamp element toward said holder means for pressing one of said legs into said recess and the other of said legs into engagement with said cutting insert for fixedly clamping said cutting insert in said pocket; wherein said first engaging means inhibits lateral movement of said cutting insert and said second engaging means axial movement of said cutting insert relative to said longitudinal mounting axis.

2. The cutting tool holder according to claim 1 wherein the holder means includes a central portion and the first end is of a predetermined width that is less than said central portion's width.

3. The cutting tool holder according to claim 2 wherein the predetermined width of the holder means first end is selected to be less than the cutting insert cutting edge width in order to facilitate presentation of the insert cutting edge to a workpiece.

4. The cutting tool holder according to claim 1 wherein the clamp element having a pair of dependent legs is dimensioned so as to have a limited elevational profile.

5. The combination according to claim 1 wherein the cutting insert comprises:
- an insert body having a first end and a second mounting end;
- a pair of substantially parallel side walls extending between said first and second ends;
- a bottom wall generally perpendicular to said side walls and including therein means defining a first notch disposed in said insert body and substantially extending from said first end to said second end; and
- a top wall having a forward section, a middle section and a rearward section, said forward section in combination with said first end including means defining a cutting edge disposed at a first elevation relative to said bottom wall, said middle section including means defining at least in part a second notch substantially extending thereacross with said second notch bottom portion being disposed at a second elevation relative to said bottom wall, and said rearward section being disposed at a third elevation relative to said bottom wall, which third elevation is less than said first and greater than said second elevations.

6. A cutting insert tool holder for holding a cutting comprising:
- holder means having a first end, a second end, a top surface and a longitudinal mounting axis;
- said first end having a cutting insert receiving pocket formed therein which pocket has one end wall means and a bottom wall means and being open on the other four sides, said bottom wall means defining a first engaging means for engaging a bottom of said insert comprising a seat having an inverted "V" shaped portion on which said cutting insert is mounted and extending parallel to said longitudinal mounting axis, said end wall means comprising means for engaging a rear wall of said insert;
- said top surface having a recess therein near said insert receiving pocket, said recess being substantially perpendicular to said longitudinal mounting axis;
- a clamp element having a lower surface a pair of dependent legs, depending below said lower surface one of said legs defining a second engaging means for engaging a top of said cutting insert, and the other of said legs adapted to cooperate with said recess in said holder means top surface;
- and means on said holder means engaging said clamp element and adjustable for urging said clamp element toward said holder means for pressing one of said legs into said recess and the other of said legs into engagement with said cutting insert for fixedly clamping said cutting insert in said pocket; wherein said first engaging means inhibits lateral movement of said cutting insert and said second engaging means axial movement of said cutting insert relative to said longitudinal mounting axis.

7. The cutting tool holder according to claim 6 wherein the holder means includes a central portion and the first end is of a predetermined width that is less than said central portion's width.

8. The cutting tool holder according to claim 7 wherein the predetermined width of the holder means first end is selected to be less than the cutting insert cutting edge width in order to facilitate presentation of the insert cutting edge to a workpiece.

9. The cutting tool holder according to claim 6 wherein the clamp element having a pair of dependent legs is dimensioned so as to have a limited elevational profile.

10. The cutting insert tool holder according to claim 6 wherein the cutting insert comprises:
- an insert body having a first end and a second mounting end;
- a pair of substantially parallel side walls extending between said first and second ends;
- a bottom wall generally perpendicular to said side walls and including therein means defining a first notch disposed in said insert body and substantially extending from said first end to said second end; and
- a top wall having a forward section, a middle section and a rearward section, said forward section in combination with said first end including means defining a cutting edge disposed at a first elevation relative to said bottom wall, said middle section including means defining at least in part a second notch substantially extending thereacross with said second notch bottom portion being disposed at a second elevation relative to said bottom wall, and said rearward section being disposed at a third elevation relative to said bottom wall, which third elevation is less than said first and greater than said second elevations.

* * * * *